(12) United States Patent
Spinelli et al.

(10) Patent No.: US 8,463,534 B2
(45) Date of Patent: Jun. 11, 2013

(54) POSITION/TIME SYNCHRONIZATION OF UNMANNED AIR VEHICLES FOR AIR REFUELING OPERATIONS

(75) Inventors: Charles B. Spinelli, Bainbridge Island, WA (US); Glenn Hanbey, Auburn, WA (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 12/945,856

(22) Filed: Nov. 13, 2010

(65) Prior Publication Data

US 2012/0123668 A1    May 17, 2012

(51) Int. Cl.
| | |
|---|---|
| *G08G 5/00* | (2006.01) |
| *G05D 1/00* | (2006.01) |
| *B64D 39/00* | (2006.01) |
| *G01S 13/00* | (2006.01) |
| *G01C 23/00* | (2006.01) |
| *G06F 19/00* | (2006.01) |

(52) U.S. Cl.
USPC .............. 701/120; 244/135 A; 342/29; 701/3; 701/14; 701/16; 701/467

(58) Field of Classification Search
USPC ............... 244/289, 118.5, 135 A, 174.2, 181, 244/183, 195, 76 R; 315/167, 291; 324/207.18, 324/207.26, 330; 340/568.1, 815.55, 853.5, 340/909, 945, 947, 961, 967, 968, 970, 971, 340/972, 973, 974, 976, 979, 980, 988, 995.26, 340/995.27; 342/18, 26 B, 29, 30, 33, 35, 342/357.29, 357.3, 357.4, 357.41, 357.48, 342/357.59, 357.62, 36, 401, 407, 408, 411, 342/413, 42, 423, 451, 455, 53, 54, 55, 63; 345/102, 156, 27, 421, 473, 619, 633, 638, 345/690, 8, 9; 348/113, 117, 118, 32, 51, 348/742, 139, 146, 43; 382/103, 240, 242; 434/11, 2, 239, 35, 37, 51; 701/11, 110, 120, 701/123, 14, 16, 2, 23, 24, 3, 300, 301, 4, 701/400, 411, 418, 454, 455, 458, 466, 467, 701/468, 469, 470, 472, 475, 480, 489, 492, 701/5, 500, 506, 514, 528, 532, 533, 538, 701/541, 7, 8, 9, 94
See application file for complete search history.

(56) References Cited

U.S. PATENT DOCUMENTS 5,451,963 A * 9/1995 Lempicke ................ 342/357.31
(Continued)

OTHER PUBLICATIONS

Brian S. Burns, Major, USAF Autonomous Unmanned Aerial Vehicle Rendezvous for Automated Aerial Refueling—Thesis Air Force Institute of Technology, Air University pp. 6-10.*
"KC-10 Air Refueling Rendezvous without Electronic Emission"; Leuschen, Michael W.; Williams, Paul; AIR Command and Staff Coll Maxwell AFB AL—Report No. 88/1575; Defense Technical Information Center—ADA192522; Apr. 1988.

(Continued)

*Primary Examiner* — Fadey Jabr
*Assistant Examiner* — Kevin P Mahne
(74) *Attorney, Agent, or Firm* — Ameh IP; Elahe Toosi; Lowell Campbell (57) ABSTRACT

An aircraft position synchronization system and methods for coordinating positioning of vehicles in motion are presented. A rabbit calculation module calculates a planned position on an orbit pattern of an aircraft in flight, and a planned position-time projection vector comprising a planned velocity vector of the planned position. A display module graphically displays the orbit pattern, the planned position and the planned velocity vector of the planned position moving in real-time along the orbit pattern. The display module further displays the planned position-time projection vector, an actual position of the aircraft, and an actual position-time projection vector of the aircraft based on a bank angle of the aircraft such that a user determines the planned position on the planned position-time projection vector of the aircraft in order to arrive at a predetermined position at a correct time. A rendezvous module coordinates the aircraft with a second aircraft in flight.

17 Claims, 9 Drawing Sheets

U.S. PATENT DOCUMENTS

| | | | | |
|---|---|---|---|---|
| 5,781,146 | A * | 7/1998 | Frederick | 342/26 B |
| 5,828,332 | A * | 10/1998 | Frederick | 342/26 B |
| 6,262,679 | B1 * | 7/2001 | Tran | 342/29 |
| 6,405,107 | B1 * | 6/2002 | Derman | 701/3 |
| 6,489,898 | B1 * | 12/2002 | Nicholls | 340/975 |
| 6,633,810 | B1 * | 10/2003 | Qureshi et al. | 701/467 |
| 6,678,587 | B2 * | 1/2004 | Miller | 701/3 |
| 7,474,962 | B2 * | 1/2009 | Waid et al. | 701/470 |
| 7,689,328 | B2 | 3/2010 | Spinelli | |
| 7,798,449 | B2 * | 9/2010 | Small et al. | 244/135 A |
| 2002/0193915 | A1 * | 12/2002 | Miller | 701/3 |
| 2003/0193411 | A1 * | 10/2003 | Price | 340/973 |
| 2004/0122567 | A1 * | 6/2004 | Gaier | 701/4 |
| 2006/0212182 | A1 * | 9/2006 | Shaw | 701/12 |
| 2010/0030401 | A1 * | 2/2010 | Rogers et al. | 701/3 |
| 2012/0123668 | A1 * | 5/2012 | Spinelli et al. | 701/120 |
| 2012/0153084 | A1 * | 6/2012 | Etzkorn et al. | 244/135 A |

OTHER PUBLICATIONS

Extended European Search Report mailed on Mar. 5, 2012.

Jourdan et al, "Trajectory design and vehicle guidance for a mid-air rendezvous between two autonomous aircraft", thesis, MIT, Mar. 1, 2006.

Burns B S et al, "Autonomous control for automated aerial refueling with minimum time rendezvous, AIAA Guidance, Navigation and Control conference" vol. 4, Aug. 20, 2007, AIAA 2007-6739, pp. 3683-3701.

Takeshi Yamasaki et al. "Sliding mode based pure pursuit guidance for UAV rendezvous and chase with a cooperative aircraft", 2010 American Control Conference, IEEE, Piscataway, NJ, USA, Jun. 30, 2010, pp. 5544-5549.

* cited by examiner

FIG. 1
EXISTING ART

FIG. 2
EXISTING ART

POSITION/TIME SYNCHRONIZATION OF UNMANNED AIR VEHICLES FOR AIR REFUELING OPERATIONS

FIELD

Embodiments of the present disclosure relate generally to aerial refueling. More particularly, embodiments of the present disclosure relate to aircraft synchronization and rendezvous during aerial refueling.

BACKGROUND

Aerial refueling is a process of transferring fuel from a tanker aircraft to a receiver aircraft during flight. Aerial refueling allows the receiver aircraft to extend its range or remain airborne longer. By aerial refueling after take-off, the receiver aircraft can allow a take-off with a greater payload, since a maximum take-off weight can be met by carrying less fuel. Probe and drogue, and flying boom are two main refueling systems. Aerial refueling is a well-established means in aviation to extend the range and duration/loiter of airborne aircraft. With the advent of unmanned aerial vehicles (UAV) and the absence of human pilots, autonomous aerial refueling poses new challenges.

SUMMARY

A method of position/time synchronization of unmanned air vehicles for air refueling operations is disclosed. A current position of a refueling aircraft is calculated, and a planned position of the refueling aircraft is calculated. Synchronization parameters are graphically displayed such that a user determines the planned position of the refueling aircraft on a planned flight path in order to arrive at a predetermined position at a correct time. A calculated bank angle is calculated such that the refueling aircraft intercepts the planned flight path when turned with the bank angle. The refueling aircraft can turn early at the calculated bank angle from the current position to reach a future point ahead of the planned position on the planned flight path. The refueling aircraft can then intercept the planned position, and rendezvous with a receiver aircraft. In this manner, a pilot/user can see in real-time his/her current position and plan ahead where to accurately position the tanker aircraft without guesswork. Thereby saving time during refueling operation.

In a first embodiment, an aircraft position synchronization system comprises a rabbit calculation module operable to calculate a planned position of a first aircraft. The system further comprises a display screen operable to graphically display synchronization parameters thereon such that a user determines the planned position on a planned flight path of the first aircraft in order to arrive at a predetermined position at a correct time. The system also comprises a rendezvous module operable to coordinate the first aircraft with at least one second aircraft.

In a second embodiment, a method for synchronizing aircraft positions in flight calculates a planned position of a first aircraft. The method then graphically displays synchronization parameters on a display screen such that a user determines the planned position of the first aircraft on a planned flight path in order to arrive at a predetermined position at a correct time.

In a third embodiment, a method of coordinating positioning of vehicles in motion graphically presents displayed synchronization parameters on a display screen such that a user determines a planned position of a first vehicle on a planned path in order to arrive at a predetermined position at a correct time. The method further synchronizes the first vehicle with the planned position on the planned path using the displayed synchronization parameters, and performs rendezvous between the first vehicle and a second vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft refueling systems, flight control systems, equations of motion, display technology, aircraft operation, and other functional aspects of the systems (and the individual operating components of the systems) may not be described in detail herein. In addition, those skilled in the art will appreciate that embodiments of the present disclosure may be practiced in conjunction with a variety of different aircraft control systems, electrical systems and aircraft wing configurations, and that the system described herein is merely one example embodiment of the disclosure.

Embodiments of the disclosure are described herein in the context of practical non-limiting applications, namely, aerial refueling. Embodiments of the disclosure, however, are not limited to such aerial refueling, and the techniques described herein may also be utilized in other refueling applications. For example, embodiments may be applicable to ship refueling, helicopter-ship refueling, fuel tanker-vehicle ground refueling, and the like.

As would be apparent to one of ordinary skill in the art after reading this description, the following are examples and embodiments of the disclosure, and are not limited to operating in accordance with these examples. Other embodiments may be utilized and structural changes may be made without departing from the scope of the exemplary embodiments of the present disclosure.

Aerial refueling is a process of transferring fuel from a tanker aircraft to a receiver aircraft during flight. The tanker aircraft may comprise, for example but without limitation, narrow body jetliners, wide body jetliners, helicopters, and the like. The receiver aircraft may comprise, for example but without limitation, jet fighters, cargo planes, passenger aircraft, narrow body jetliners, wide body jetliners, helicopters, and the like.

Aerial refueling is a well-established means in aviation to extend the range and duration/loiter of airborne aircraft. With the advent of unmanned aerial vehicles (UAV) and the absence of human pilots, autonomous aerial refueling poses new challenges. Embodiments of the disclosure provide a reliable solution to autonomous tanker and UAV rendezvous is that significantly increase the mission capabilities of UAVs. The embodiments provide means to coordinate a tanker aircraft and at least one receiving aircraft of any type to arrive at a common event point in spatial coordinates at a specific time such that refueling operations can commence.

Figure 1:
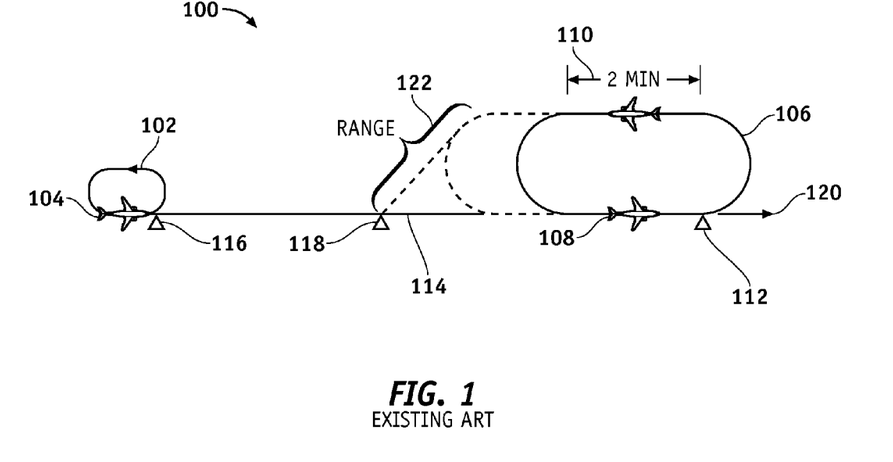
FIG. 1 is an illustration of orbit patterns for aerial refueling operation showing an orbit pattern of a receiver aircraft in a vicinity of an orbit pattern of a tanker aircraft.

FIG. 1 is an illustration of existing orbit patterns 100 for aerial refueling operation showing a receiver aircraft orbit pattern 102 (receiver orbit pattern 102) of a receiver aircraft 104 in a vicinity of a tanker aircraft orbit pattern 106 (tanker orbit pattern 106) of a tanker aircraft 108. In the example embodiment shown in FIG. 1, the tanker orbit pattern 106 for point parallel/anchor rendezvous procedures is a racetrack pattern to the left, using 2 minute legs 110 and 30 degree banked turns with an Air Refueling Control Point (ARCP) 112. The ARCP 112 is the primary reference for the rendezvous. The ARCP 112 is a planned geographical point over which the receiver aircraft 104 arrives in an observation/pre-contact position with respect to the tanker aircraft 108, at a downstream end of the 2 minute leg 110 that coincides with an inbound rendezvous track 114 of the receiver aircraft 104. The receiver aircraft 104 calls in to the tanker aircraft 108 at an Air Refueling Initial Point (ARIP) 116. The ARIP 116 is a point (rendezvous position) upstream from the ARCP 112 at which the receiver aircraft 104 initiates a rendezvous with the tanker aircraft 108. The ARIP 116 is a 15 minute call point (15 minutes prior to the Air Refueling Control Time (ARCT). An ARCT is the receiver aircraft planned arrival time at an ARCP. At the ARIP 116, the receiver aircraft 104 transmits information, such as but without limitation, call sign, estimated time of arrival (ETA) (on time, minutes early, or minutes late), altitude, and the like, to the tanker aircraft 108. Similarly, at the ARIP 116 the tanker aircraft 108 transmits information, such as but without limitation, air refueling altitude, altitude, timing (on time, minutes early, or minutes late), and the like, to the receiver aircraft 104.

The ARIP 116 is reached when the receiver aircraft 104 is on the inbound rendezvous track 114. The tanker aircraft 108 altitude, ARCP, ARIP and the ARCT are given in the mission plan/air tasking technical orders. Airspeed of the tanker aircraft 108 and the receiver aircraft 104 are also set according to an air refueling technical order for each receiver aircraft. The range 122 to begin turn at a point 118 to rendezvous is calculated by the user/pilot or copilot. A turn is executed when the onboard ranging equipment (Terrain Collision Avoidance System (TCAS)) states the range 122 is equal to the calculated range. The receiver aircraft 104 maintains about 1000 feet below air refueling base altitude until visual contact is established (e.g., visual contact must be made at 1 nm or in accordance with technical order visibility for rendezvous closure) with the tanker aircraft 108. The range 122 at which to turn is calculated by knowing an offset and velocity of the receiver aircraft 104 and the tanker aircraft 108, and is determined such that the tanker aircraft 108 is about 1-3 nmi in front of the receiver aircraft 104 when the tanker aircraft 108 completes its turn. The offset is a calculated displaced lateral distance (i.e. a minor diameter of the orbit pattern 106) between the tanker aircraft 108 at the 2 minute leg 110 and an air fueling track 120 that allows the tanker aircraft 108 to turn in front of the receiver 1-3 miles on the air refueling track 120 inbound to the ARCP 112. From the offset, a bank angle Θ (or vice versa) can be determined by the following equation:

$$r\left(\frac{1}{2}\text{offset}\right) = \frac{v^2}{11.26\tan(\theta)} \qquad (1)$$

Where Θ is the bank angle, r is radius of the turn, and v is the aircraft velocity in knots.

Then the receiver aircraft 104 makes a controlled closure on the tanker aircraft 108 and refueling operations begin along the air fueling track 120. In an event the receiver aircraft 104 arrive early, the receiver orbits at the ARIP 116.

Figure 2:
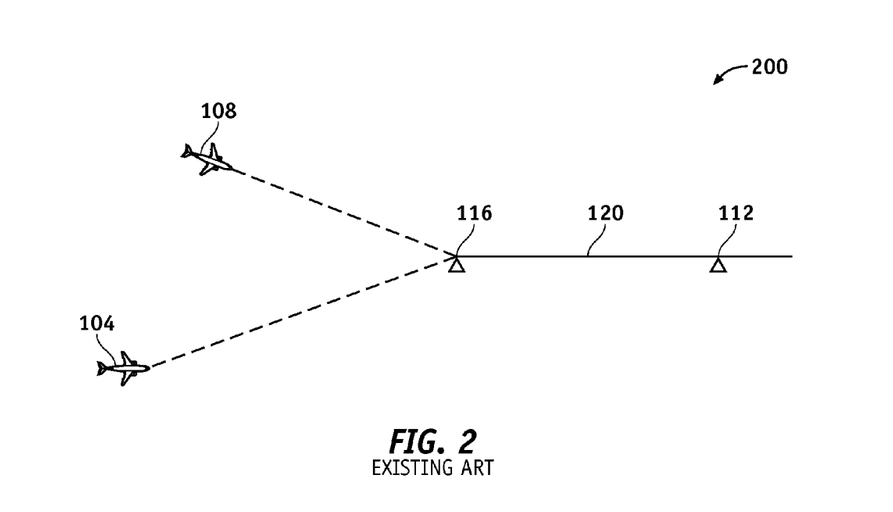
FIG. 2 is an illustration of an enroute refueling rendezvous for a receiver aircraft and a tanker aircraft.

FIG. 2 is an illustration of an existing enroute refueling rendezvous 200 for the receiver aircraft 104 and the tanker aircraft 108. For enroute procedures, the rendezvous comprises both aircraft flying to the ARIP 116 within one minute of each other and then along a common track 120 to the ARCP 112. Tanker aircraft 108 (or multiple tanker aircraft) and receiver aircraft 104 (or multiple receiver aircraft) may join up at a rendezvous point (RZ) by controlling the timing so they arrive at the RZ at the same time. Timing to the RZ may be adjusted using differential airspeeds, orbit delays or timing triangles.

Embodiments of the disclosure calculate and indicate on a display screen where the tanker aircraft 108 and receiver aircraft 104 need to be at any given time in order to initiate aerial refueling.

According to embodiments of the disclosure at least two position-time projections are displayed on a display screen as explained in more detail below. One is a planned position and one is a real-time projection based on a current position, velocity, attitude, and wind from the Inertial Navigation System (INS) and/or the Global Positioning System (GPS). The planned position (or rabbit) represents where the tanker aircraft 108 must be in order to begin refueling operations given a known position of the receiver aircraft 104. The pilot/user can see in real-time his/her current position and plan ahead where to position the tanker aircraft 108 without mental calculation and guesswork.

Figure 3:
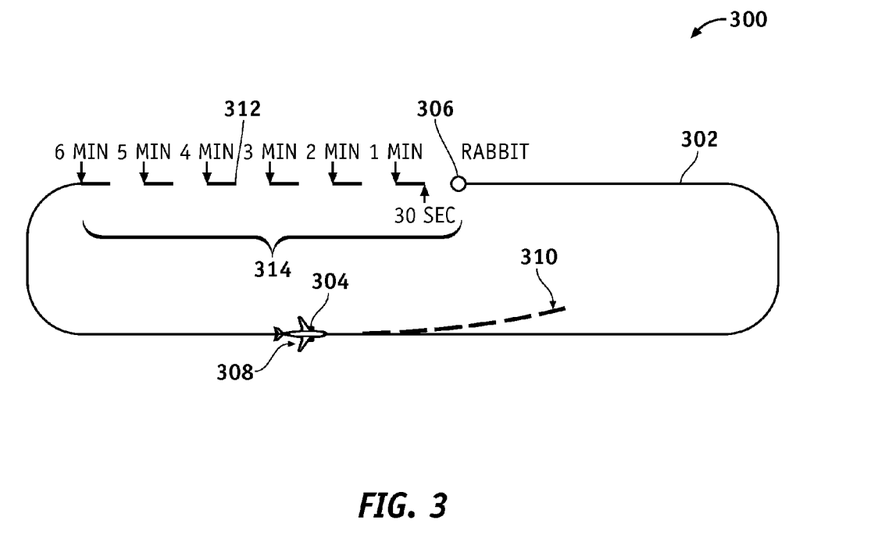
FIG. 3 is an illustration of an orbit pattern of a tanker aircraft showing position time projection (PTP) according to an embodiment of the disclosure.

FIG. 3 is an illustration of a tanker orbit pattern 302 of a tanker aircraft 304 showing position-time projection (PTP) according to an embodiment of the disclosure. The PTP is a display of planned position vs. time. The PTP illustrates where the tanker aircraft 304 must be at any given time on the tanker orbit pattern 302. The planned position 306 at a current/actual time is called a rabbit (rabbit/rabbit position 306). From the rabbit 306, a set of dashed lines are marked on a planned position-time projection vector 314 (planned flight path 314) to show planned future positions, for example, in 30 sec increments ahead of the rabbit 306. A waypoint on the planned flight path 314 is selected as the synchronization point (usually the ARCP 112) and pilot/user sets the time he/she wants to arrive at that point. The waypoint may also be selected locally via an autopilot, or remotely via a user. As a real time clock runs the rabbit 306 and its planned velocity vector 312 move along the planned flight path 314 showing the pilot/user where on the planned flight path 314 the tanker aircraft 304 needs to be positioned in order to arrive at the ARCP 112 at the correct time. The current or actual position-time flight path projection vector 310 (actual flight path 310) is the same position-time flight path projection vector used in modern aircraft. The planned flight path 310 is projected using the current aircraft attitude, position, ground speed and heading transmitted from the attitude reference system. The actual flight path 310 is displayed in 30 second increments similar to the planned flight path 314. If wind data is available, the position-time projection vector 310 can reflect the effects of the winds on the planned velocity vector 312 of the planned flight 314 as shown in FIG. 4.

Figure 4:
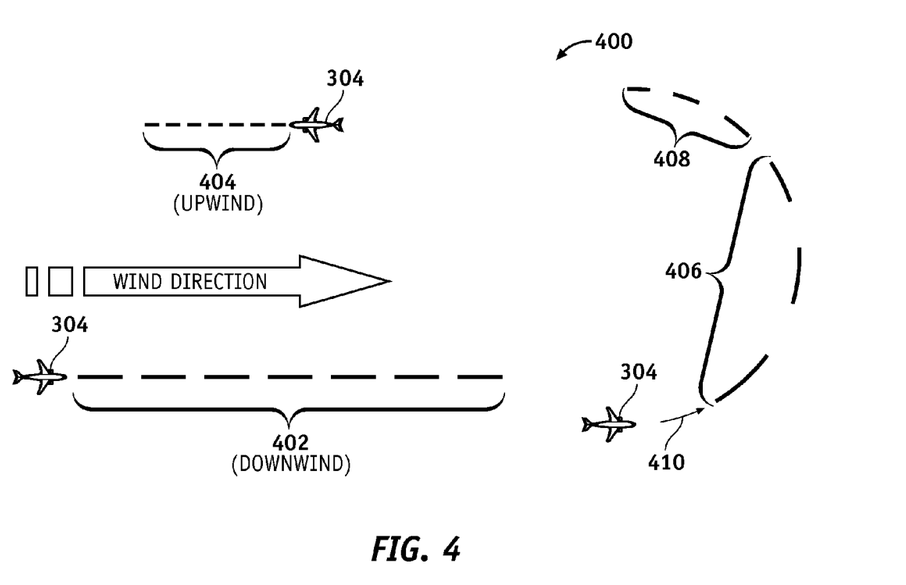
FIG. 4 is an illustration of an effect of winds on a velocity vector of an aircraft during a banked turn.

FIG. 4 is an illustration of effect of winds on a velocity vector of the tanker aircraft 304 during a banked turn 410 according to an embodiment of the disclosure. A tail wind 402 relative to the ground extends the planned velocity vector 312, and a head wind 404 retards the planned velocity vector 312 relative to the ground. In this manner, in a 180 degree banked turn 410 the planned velocity vector 312 comprises a combination of effect of both the tail wind 402 and the head wind 404 resulting in planned velocity vectors 406 and 408 respectively.

FIGS. 5-9 illustrate an aerial refueling scenario according an embodiment of the disclosure.

Figure 5:
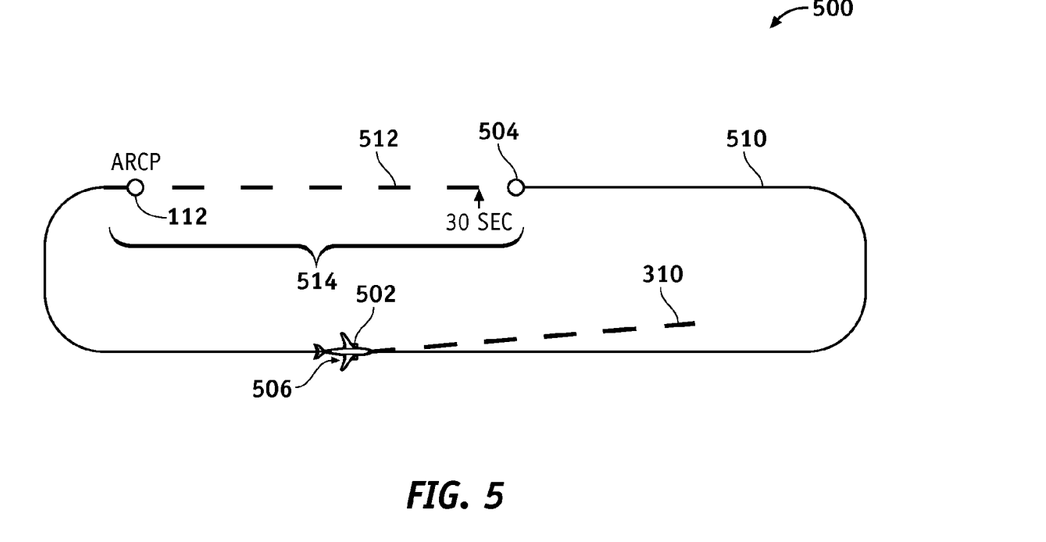
FIG. 5 is an illustration of an exemplary aerial refueling operation showing a tanker aircraft out of a planned position according to an embodiment of the disclosure.

FIG. 5 is an illustration of an exemplary aerial refueling operation showing a tanker aircraft 502 out of position according to an embodiment of the disclosure.

Figure 6:
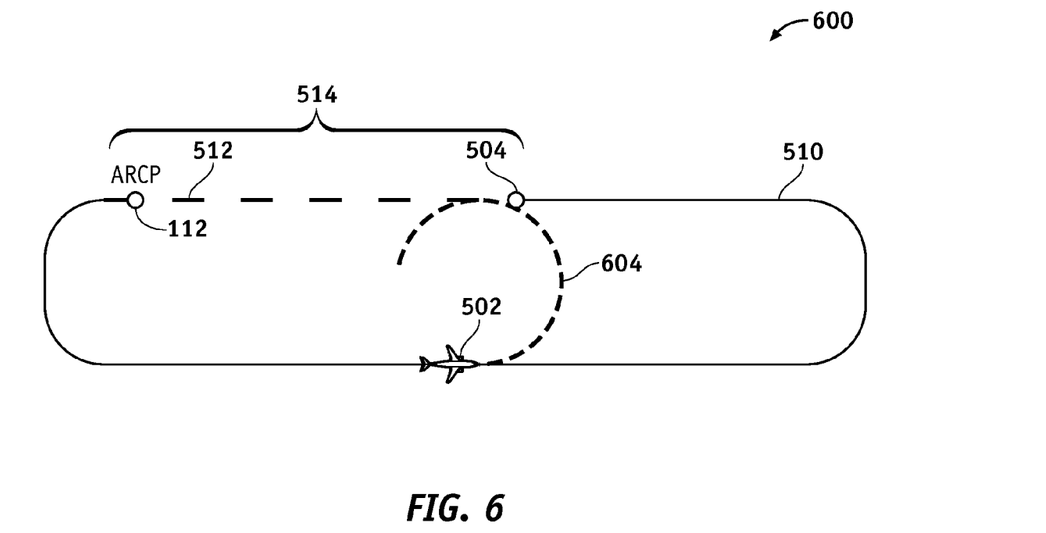
FIG. 6 is an illustration of the exemplary orbit pattern of the tanker aircraft of FIG. 5 showing that the tanker aircraft is performing a first banked turn in order to select an intercept point for the planned position on its orbit pattern according to an embodiment of the disclosure.

FIG. 6 is an illustration of an exemplary orbit pattern 510 of a tanker aircraft 502 showing the tanker aircraft 502 is banked in banked turn 604 in order to select an intercept point for a planned position 504 (rabbit/rabbit position 504) on the orbit pattern 510 according to an embodiment of the disclosure.

Figure 7:
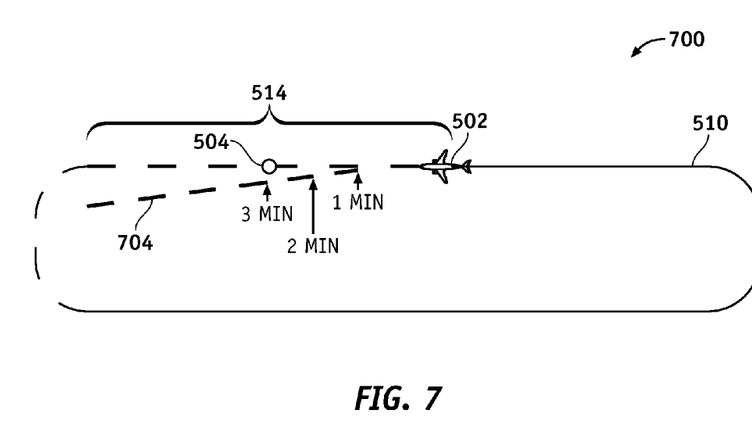
FIG. 7 is an illustration of the exemplary orbit pattern of the tanker aircraft of FIG. 6 showing the tanker aircraft of FIG. 6 is now about 2.5 minutes late according to an embodiment of the disclosure.

FIG. 7 is an illustration of an exemplary orbit pattern 510 of a tanker aircraft 502 showing the tanker aircraft 510 of the FIG. 6 is now about 2.5 minutes late according to an embodiment of the disclosure.

Figure 8:
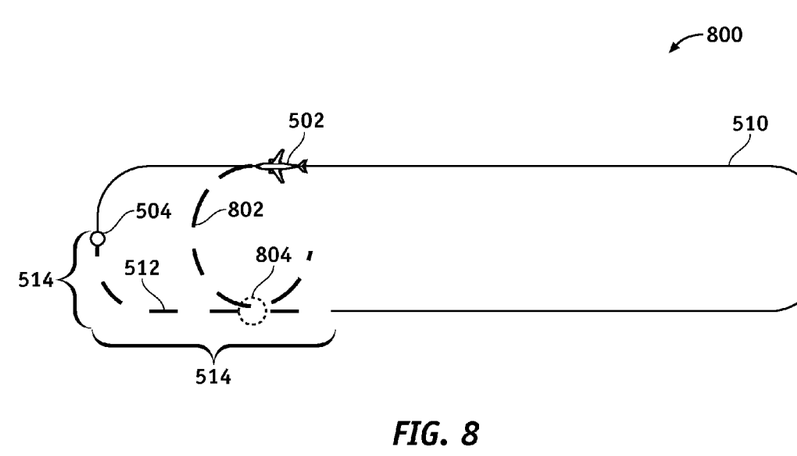
FIG. 8 is an illustration of the orbit pattern of the tanker aircraft of the FIG. 7 showing the tanker aircraft has increased its bank angle in a second banked turn to intercept the planned position (rabbit) on time according to an embodiment of the disclosure.

FIG. 8 is an illustration of the orbit pattern 510 of the tanker aircraft 502 of the FIG. 7 showing the tanker aircraft 502 has increased its bank angle Θ in a second turn to intercept the planned position 504 (rabbit position 504) on time according to an embodiment of the disclosure.

Figure 9:
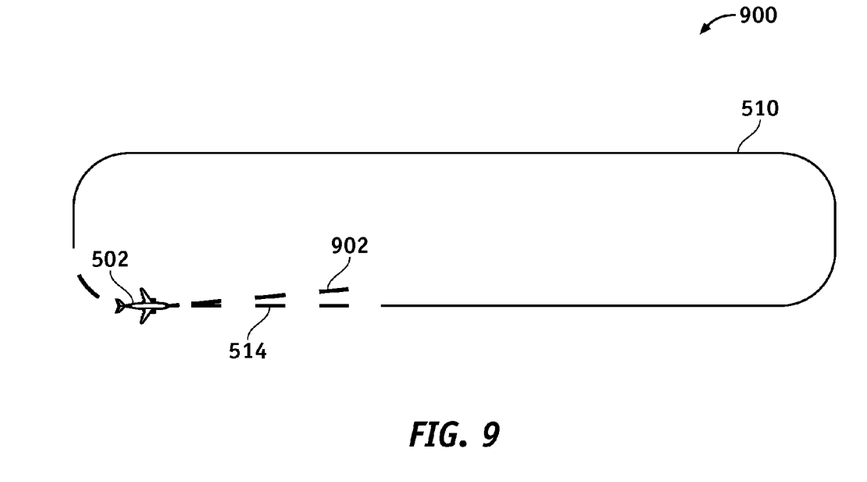
FIG. 9 is an illustration of the orbit pattern of the tanker aircraft of the FIG. 8 showing the tanker aircraft is now in sync with the planned position according to an embodiment of the disclosure.

FIG. 9 is an illustration of the orbit pattern 510 of the tanker aircraft 502 of the FIG. 8 showing the tanker aircraft 502 is now in sync with the planned flight path 514 according to an embodiment of the disclosure.

Figure 10:
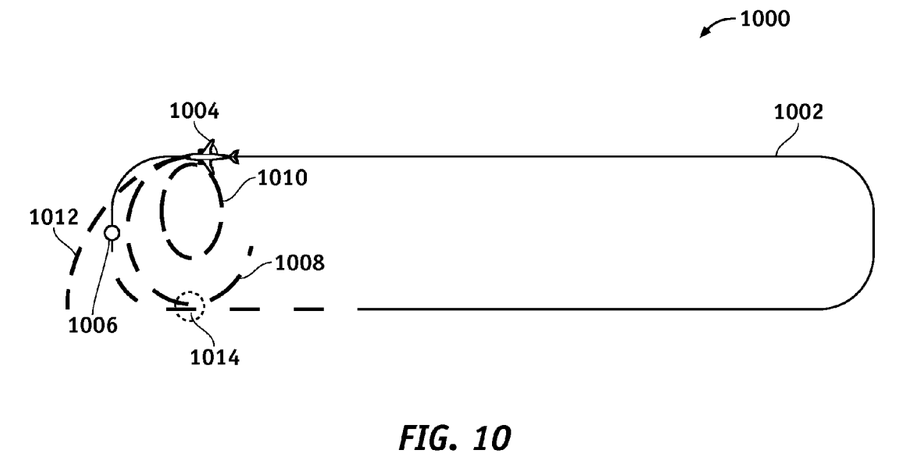
FIG. 10 is an illustration of an exemplary orbit pattern of a tanker aircraft showing effect of bank angle of the tanker aircraft on position-time projection and immediate feedback to a pilot according to an embodiment of the disclosure.
Figure 14:
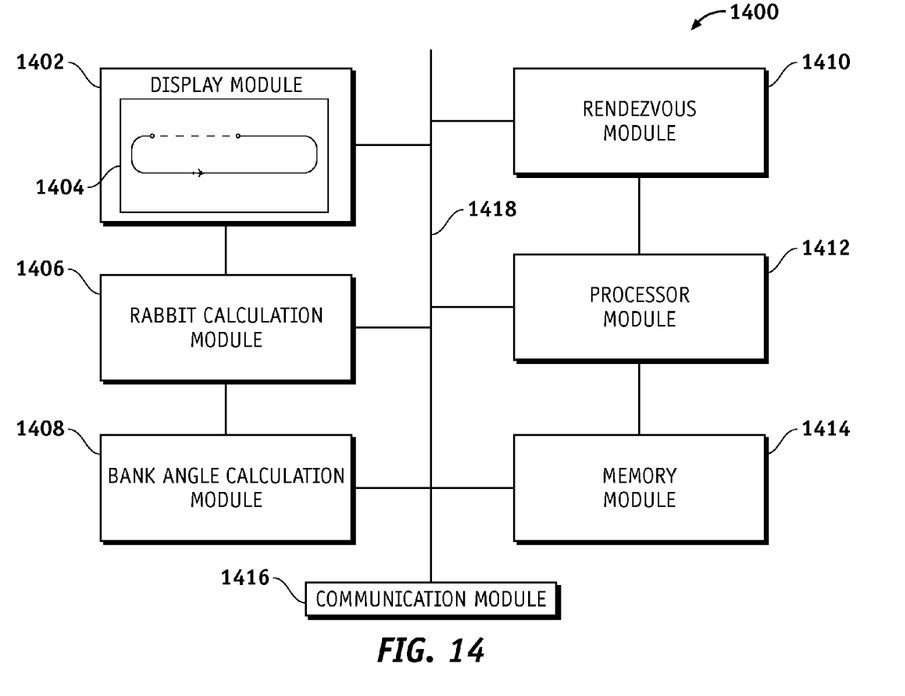
FIG. 14 is an illustration of an exemplary functional block diagram of air refueling synchronization and rendezvous system according to an embodiment of the disclosure.

FIG. 5 shows the tanker aircraft 502 planned position-time projection vector 514 (planned flight path 514), a planned position 504 (rabbit/rabbit position 504), an actual/current position 506, and the actual position-time projection vector 310 (actual flight path 310). This scenario can come about by a change in the ARCP 112 during refueling operations, for instance when an unplanned receiver approaches from the opposite direction of the current refueling mission plan. In this hypothetical case the ARCP 112 is changed to accommodate the new receiver. To synchronize the tanker aircraft 502 in this scenario, the pilot will begin to execute a left banked turn 604 several minutes before it is a beam of the planned position 504 as shown in FIG. 6. In the existing solution the pilot has no reliable way to assess whether his/her bank angle Θ (i.e., turn rate Θ̇) is too much or too little. The result is poor synchronization with the planned flight path 514. In contrast, according to embodiments of the disclosure, the pilot can correctly assess what bank angle Θ will correctly synchronize his/her plane with the planned flight path 514. FIG. 6 shows the pilot making the banked turn 604 towards the rabbit position 504. Since the tanker aircraft 502 is positioned on the opposite side of the tanker orbit 510, it may take more than one banked turn 604 to synch with the rabbit position 504 because by the time the tanker aircraft 502 executes its 4 minute banked turn, the rabbit position 504 has also progressed 4 minutes down the planned flight path 514. The tanker aircraft 502 can "catch the rabbit" at the next turn, as shown in FIG. 7. The tanker aircraft 502 arrives on the planned flight path 514 about 2.5 minutes late and "catches up" in the next turn. FIG. 8 shows the pilot slowly increasing the bank angle Θ until the planned flight path 514 and the actual flight path 802 meet at a selected time (3.5 minutes in this example). In this manner, the actual flight path 802 intercepts the rabbit position 504 at position 804 after it makes the planned turn. The tanker aircraft 502 is now synched with the planned flight path 514 as shown in FIG. 9. FIG. 10 shows an effect of bank angle Θ on the position-time-projection and an immediate feedback the pilot sees on the display screen 1404 (FIG. 14).

FIG. 10 is an illustration of an exemplary tanker orbit pattern 1002 of a tanker aircraft 1004 showing the effect of bank angle Θ of the tanker aircraft 1004 on actual position-time projection vectors 11010/1008/1012 (actual flight path 1010/1008/1012) and substantially immediate feedback that can be observed on the display screen 1404 (FIG. 14) by a pilot/user according to an embodiment of the disclosure. FIG. 10 shows an effect of a correct amount of bank angle Θ on the actual flight path 1008, too much bank angle Θ on the actual flight path 1010, and too little bank angle Θ on the actual flight path 1012. As explained in more detail below, system 1400 determines for the pilot/user when to turn and how much bank angle Θ is required to intercept the planned flight path 514 on the rabbit position 504.

Figure 11:
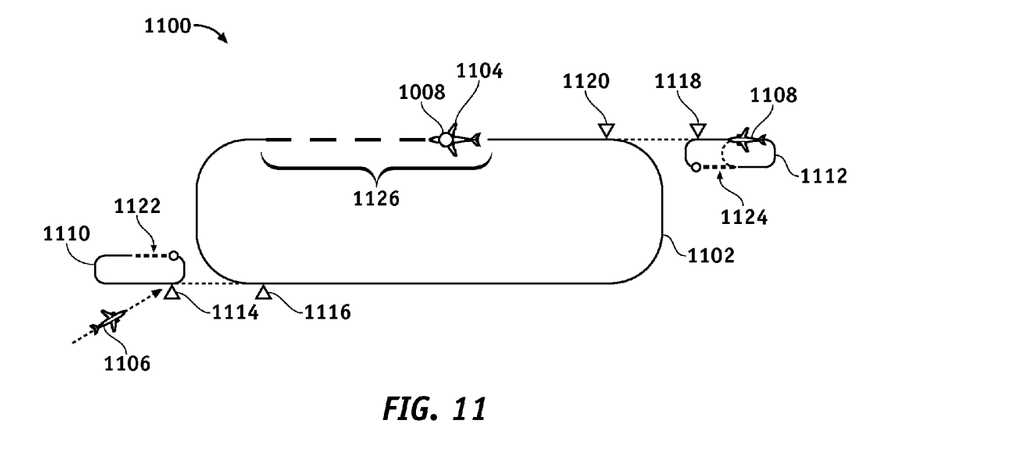
FIG. 11 is an illustration of an exemplary air refueling synchronization showing an orbit pattern of a tanker aircraft and orbit patterns of two receiver aircraft according to an embodiment of the disclosure.
Figure 12:
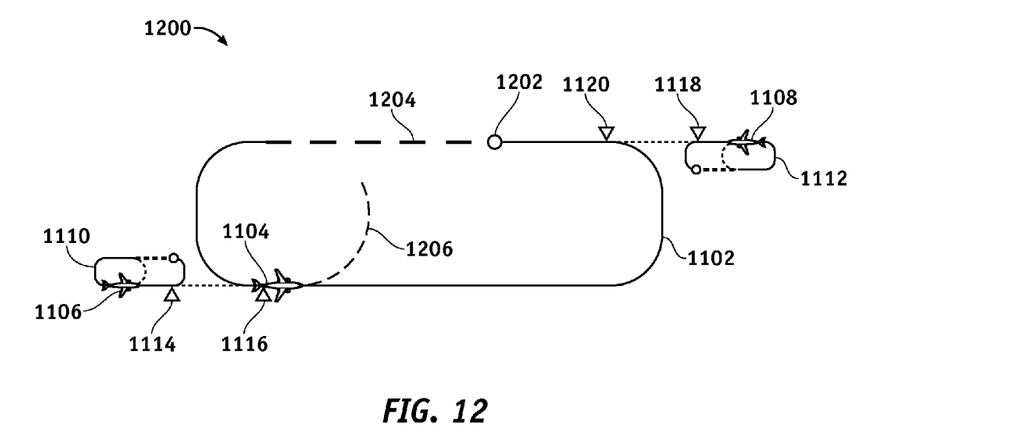
FIG. 12 is an illustration of an exemplary air refueling rendezvous after missed attempt according to an embodiment of the disclosure.

FIG. 11 is an illustration of an exemplary aerial refueling synchronization showing a tanker orbit pattern 1102 of a tanker aircraft 1104 and orbit patterns 1110 and 1112 of two receiver aircraft 1106 and 1108 respectively according to an embodiment of the disclosure. The receiver aircraft 1106/1108 and the tanker aircraft 1104 may be, for example but without limitation, a UAV, a manned aircraft, or the like. In this example, UAVs are used for the receiver aircraft 1106/1108 and the tanker aircraft 1104. Facilitating rendezvous between the receiver aircraft 1106/1108 (UAV 1106/1108) and the tanker aircraft 1104 can be accomplished by using the position-time projection method described above. A UAV 1106/1108 mission comprises a refueling operation. The UAV 1106/1108 communicates with the tanker aircraft 1104 to let the tanker aircraft 1104 know the UAV 1106/1108 type and initial position ARIP1 1114/ARIP2 1120, which ensures a timing of the air refueling operation is coordinated. As shown in FIG. 11 the receiver aircraft 1106/1108 is synced to the tanker aircraft 1104 position and speed using a planned position-time projection vector 1122/1124 (UAV planned flight path 1122/1124) on the receiver aircraft orbit pattern 1110/1112. The UAV 1106/1108 continues to fly the receiver aircraft orbit pattern 1110/1112 tracking the tanker aircraft 1104 planned position-time projection vector 1126 (planned flight path 1126). When the tanker aircraft 1104 arrives at the ARCP1 1116/ARCP2 1120 the UAV 1106/1108 should be in a rendezvous position such as the ARIP1 1114/ARIP2 1118 to accomplish the rendezvous and begin refueling. After refueling, the UAV 1106/1108 exits the orbit patterns 1110/1112 by flying a pre-determined flight path and then continues on with its mission (flies to the first post-fueling waypoint in a mission plan), and the tanker aircraft 1104 initiates a rendezvous sequence with the next receiver aircraft 1106/1108. The benefit is safe, efficient UAV refueling operations allowing several aircraft to be refueled in a given amount of time. In the event the receiver aircraft 1106/1108 misses the tanker rendezvous, another orbit pattern can be initiated as shown in FIG. 12. The system 1400 explained below computes the most efficient rendezvous flight paths for each aircraft and guide them to the ARCP1 1116/ARCP2 1120 at the new designated Air Refueling Control Time (ARCT). When refueling a manned vehicle, standard procedure is for the tanker aircraft 1104 to complete its rendezvous turn 3 nmi in front of the receiver aircraft 1106/1108, allowing the receiver aircraft 1106/1108 to make a controlled closure on the tanker aircraft 1104. The same protocol exists in the UAV scenario. The UAV 1106/1108 comprises communications onboard first to alert the tanker aircraft 1104 that the UAV 1106/1108 is ready to begin refueling rendezvous operations (i.e. it is in its orbit pattern 1110/1112), and second to receive the commands such as waypoints and associated desired velocities, from the tanker aircraft 1104.

FIG. 12 is an illustration of an exemplary air refueling rendezvous after missed attempt according to an embodiment of the disclosure. If the receiver aircraft 1106/1108 misses the sync, the tanker aircraft 1104 performs a bank turn 1206 and comes around. In this manner, the tanker aircraft 1104 communicates with the receiver aircraft 1106/1108 to determine the receiver aircraft 1106/1108 position and to determine its required bank angle Θ thereupon.

Figure 13:
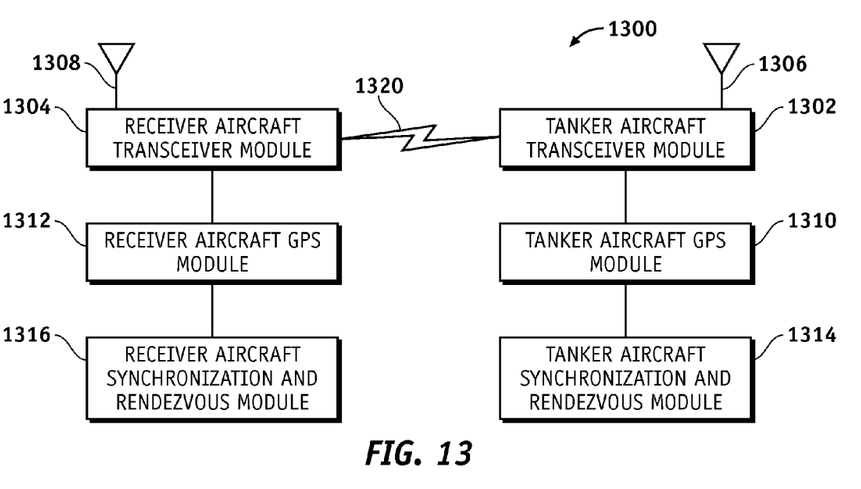
FIG. 13 is an illustration of an exemplary radio communication system of a tanker aircraft and a receiver aircraft according to an embodiment of the disclosure.

FIG. 13 is an illustration of an exemplary radio communication system (system 1300) for communication between the tanker aircraft 1104 and the receiver aircraft 1106 according to an embodiment of the disclosure. A practical embodiment of the system 1300 comprises additional components and elements configured to support known or conventional operating features that need not be described in detail herein. The system 1300 generally comprises a tanker aircraft transceiver module 1302, a receiver aircraft transceiver module 1304, a tanker aircraft GPS module 1310, a receiver aircraft receiver GPS module 1312, a tanker aircraft synchronization and rendezvous module 1314, and a receiver aircraft synchronization and rendezvous module 1314.

In the example embodiment, the system 1300 can be used to transmit and receive aircraft performance parameters from the receiver aircraft 1106/1108 to and from the tanker aircraft 1104. A query from the tanker aircraft transceiver module 1302 may be sent to the receiver aircraft transceiver module 1304 seeking position and velocity of same in anticipation to a sync event. In this manner, the receiver aircraft transceiver module 1304 transmits position and velocity information of the receiver aircraft 1106/1108 aircraft to the tanker aircraft transceiver module 1302. The tanker aircraft transceiver module 1302 continuously and automatically receives the performance information/parameters of the receiver aircraft 1106/1108 for a duration of the sync event and automatically adjusts its bank angle if necessary based on the performance information until synched.

The system 1300 may comprise any number of communication modules, any number of network communication modules, any number of processor modules, and any number of memory modules. The system 1300 illustrated herein depicts a simple embodiment for ease of description. A practical embodiment of the wireless radio communication environment 1300 comprises additional components and elements configured to support known or conventional operating features. For the sake of brevity, conventional techniques and components related to digital signal processing such as channel encoding/decoding, correlation techniques, spreading/despreading, pulse shaping, radio frequency (RF) technology, and other functional aspects and the individual operating components of the wireless radio communication environment 1300 may not be described in detail herein.

In the example system 1300, the receiver aircraft transceiver module 1304 and the tanker aircraft transceiver module 1302 each comprise a transmitter module and a receiver module (not shown in FIG. 13). The receiver aircraft transceiver module 1316 and the tanker aircraft transceiver module 1302 are configured to communicate via a wireless data communication link 1320.

For this example, the tanker aircraft transceiver module 1314, and the receiver aircraft transceiver module 1316 are each coupled to their respective RF antenna arrangement 1306 and 1308 that can support a particular wireless communication protocol and modulation scheme to receive and transmit position and performance parameters respectively. The tanker aircraft transceiver module 1302 and the receiver aircraft transceiver module 1304 are each coupled to the tanker aircraft GPS module 1310 and the receiver aircraft GPS module 1312 respectively. In this manner, a current position of the tanker aircraft 1104 and a current position of the receiver aircraft 1106/1108 are determined and communicated therebetween using the transceiver modules 1302/1304. The performance parameters may comprise, for example but without limitation, aircraft velocity, aircraft coordinates, the receiver aircraft 1106/1108 indication of contact with the tanker aircraft 1104, an aircraft actual position, the receiver aircraft 1106/1108 waypoints, the receiver aircraft 1106/1108 waypoints desired velocities, and the like.

The tanker aircraft synchronization and rendezvous module 1314, and receiver aircraft synchronization and rendezvous module 1316 are each configured to synchronize the tanker aircraft 1104 to the rabbit 504 on the orbit thereof and allow the receiver aircraft 1106/1108 and the tanker aircraft 1104 to meet at a predetermined position such as the ARCP1 1116/ARCP2 1120. The tanker aircraft synchronization and rendezvous module 1314, and the receiver aircraft synchronization and rendezvous module 1316 are explained in more detail below.

FIG. 14 is an illustration of an exemplary functional block diagram of aerial refueling synchronization and rendezvous system 1400 (1314/1316 in FIG. 13) according to an embodiment of the disclosure. The system 1400 may comprise a display module 1402, a rabbit calculation modulation 1406, a bank angle calculation module 1408, a rendezvous module 1410, a processor module 1412, a memory module 1414, and a communication module 1416. These and other elements of the system 1400 may be interconnected together using a data communication bus 1418 or any suitable wired/wireless interconnection arrangement. Such interconnection facilitates communication between the various elements of the system 1400.

System 1400 may be part of a network architecture that communicates with the receiver aircraft 1106/1108, or be a standalone portable device such as a mobile phone, a personal digital assistant (PDA) such as a Blackberry™ device, Palm Treo, iPod™, iPad™, or other similar portable device. In some embodiments the system 1400 may be, for example but without limitation, a personal wireless computer such as a wireless notebook computer, a wireless palmtop computer, or other mobile computer device.

The display module 1402 may comprise, for example but without limitation, a Horizontal Situation Indicator (HSI), a display screen on a flight deck computer, a display module on a ground control computer, a display module on portable computer, and the like. The display module 1402 comprises a display screen 1404 to provide a visual aid for the user/pilot. For example, as a real time clock runs, the rabbit position 504 (FIG. 5) and its velocity vector 512 move along the planned flight path 314 graphically displaying for the pilot where on the planned flight path 514 the tanker aircraft 506 needs to be positioned in order to arrive at a predetermined position such as the ARCP 112 at the correct time. In this manner, the display screen 1404 of the display module 1402 graphically displays synchronization parameters in substantially real-time. The synchronization parameters may comprise, for example but without limitation, a calculated turn/bank angle, the planned position (rabbit) 504 on the planned flight path 514, the planned flight path 514, the actual position 506, the actual flight path 310 (current flight path 310), the orbit pattern 510, and the like. The display screen 1404 of display module 1402 may comprise an image display device such as but without limitation, a light emitting diode (LED) display, a liquid crystal display (LCD), or an organic EL display (OLED). The display module 1402 may be used to display an image corresponding to images provided by the processor module 1412.

The rabbit calculation modulation 1406 calculates the planned position (rabbit position) 504 of the tanker aircraft 502/1104 and/or the receiver aircraft 1106/1108. The tanker aircraft 502/1104 and/or the receiver aircraft 1106/1108 may be referred to as aircraft herein. The rabbit position 504 and the planned flight path 514 are calculated using a predetermined set of flight performance parameters such as aircraft translational and rotational speeds, for each aircraft and a set of waypoints that define the orbit pattern 510. A time is designated (e.g., Greenwich Mean Time (GMT)) for the tanker aircraft 1104 to arrive at the ARCP 112. A calculation process then starts from the ARCP 112 position at the designated arrival time and flies backward along the orbit pattern 510 using the selected flight performance parameters to the current time and places the rabbit position 504 at that location.

The bank angle calculation module 1408 determines for the pilot/user when to turn and how much bank angle Θ is required to intercept the planned flight path 514 on the rabbit position 504. In this manner, the pilot can correctly assess what bank angle Θ will correctly synchronize his/her aircraft with the planned flight path 514. The bank angle Θ may be calculated based on the following relationship:

$$r = \frac{v^2}{g \tan(\theta)}, \quad (2)$$

where Θ is the bank angle, r is radius of the turn, g is gravitational acceleration, and v is the aircraft velocity. Equation 2 is based on forces acting on the aircraft in a steady state turn at a constant bank angle Θ. The aircraft turns due to the horizontal component of lift. Centripetal force $$\frac{v^2}{r}$$

which is a horizontal component of lift in a turn can be solved using equation 2. In this manner, the radius of the turn r and the bank angle Θ can be derived by knowing the aircraft velocity v, the gravitational acceleration g, and one of the radius of the turn r and the bank angle Θ.

The rendezvous module 1410 computes a substantially most efficient rendezvous flight path for each receiver aircraft 1106/1108 and guide each receiver aircraft 1106/1108 to the ARCP1 1116/ARCP2 1120 at the new designated Air Refueling Control Time (ARCT) as explained above.

The processor module 1412 comprises processing logic that is configured to carry out the functions, techniques, and processing tasks associated with the operation of the system 1400. In particular, the processing logic is configured to support the synchronization and rendezvous function of the system 1400 described herein. For example, the processor module 1412 may be suitably configured to receive the performance and position information of the receiver aircraft 1106/1108 and tanker aircraft 1104 from the transceiver modules 1304 and 1302.

The processor module 1412 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor module 1412, or in any practical combination thereof. A software module may reside in the memory module 1414, which may be realized as RAM memory, flash memory, ROM memory, EPROM memory, EEPROM memory, registers, a hard disk, a removable disk, a CD-ROM, or any other form of storage medium known in the art. In this regard, the memory module 1414 may be coupled to the processor module 1412 such that the processor module 1412 can read information from, and write information to, memory module 1414. For example, processor module 1412 and the memory module 1414 may be in respective ASICs. The memory module 1414 may also be integrated into the processor module 1412. In an embodiment, the memory module 1414 may include a cache memory for storing temporary variables or other intermediate information during execution of instructions to be executed by processor module 1412. The memory module 1414 may also include non-volatile memory for storing instructions to be executed by the processor module 1412.

The communication module 1416 transmits and receives data from and to the tanker aircraft transceiver module 1302, the receiver aircraft transceiver module 1304, the tanker aircraft GPS module 1310, and the receiver aircraft receiver GPS module 1306. In this example, the communication module 1416 comprises a transmitter module and a receiver module (not shown in FIG. 14). The communication module 1416, is coupled to an RF antenna arrangement (not shown) that can support a particular wireless communication protocol and modulation scheme to, for example but without limitation, receive position and performance parameters of the tanker aircraft 1104 and the receiver aircraft 1106/1108, and transmit, for example but without limitation, the rabbit position 1008, the calculated bank angle Θ, and the like.

Figure 15:
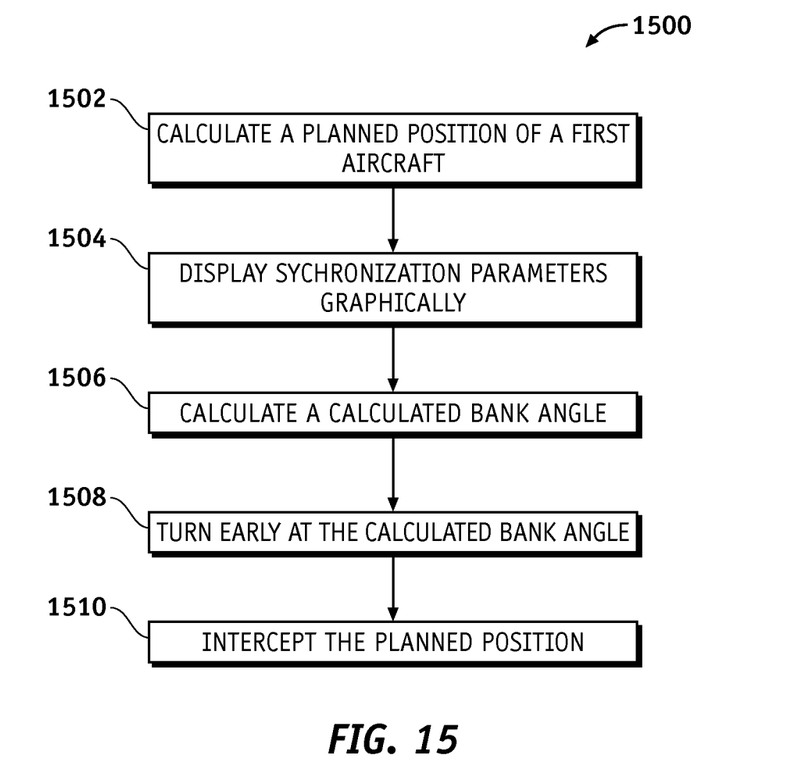
FIG. 15 is an illustration of an exemplary flowchart showing an air refueling synchronization and rendezvous process according to an embodiment of the disclosure.

FIG. 15 is an illustration of an exemplary flowchart showing an air refueling synchronization and rendezvous process 1500 according to an embodiment of the disclosure. The various tasks performed in connection with process 1500 may be performed, by software, hardware, firmware, a computer-readable medium having computer executable instructions for performing the process method, or any combination thereof. The process 1500 may be recorded in a computer-readable medium such as a semiconductor memory, a magnetic disk, an optical disk, and the like, and can be accessed and executed, for example, by a computer CPU such as the processor module 1412 in which the computer-readable medium is stored. It should be appreciated that process 1500 may include any number of additional or alternative tasks, the tasks shown in FIG. 15 need not be performed in the illustrated order, and process 1500 may be incorporated into a more comprehensive procedure or process having additional functionality not described in detail herein. For illustrative purposes, the following description of process 1500 may refer to elements mentioned above in connection with FIGS. 3-14. In practical embodiments, portions of the process 1500 may be performed by different elements of the system 1300 and system 1400 such as: the a tanker aircraft transceiver module 1302, the receiver aircraft transceiver module 1304, the tanker aircraft GPS module 1310, the receiver aircraft receiver GPS module 1312, the display module 1402, the rabbit calculation modulation 1406, the bank angle calculation module 1408, the rendezvous module 1410, the processor module 1412, the memory module 1414, and the communication module 1416. Process 1500 may have functions, material, and structures that are similar to the embodiments shown in FIGS. 3-14. Therefore common features, functions, and elements may not be redundantly described here.

Process 1500 may begin by calculating the planned position 504 of the first aircraft such as the tanker aircraft 502 (task 1502).

Process 1500 may continue by displaying synchronization parameters graphically such that a user determines the planned position 504 of the first aircraft on a planned flight path 514 in order to arrive at a predetermined position such as the ARCP 112 at a correct time (task 1504).

Process 1500 may continue by calculating a calculated bank angle Θ such that the first aircraft intercepts the planned flight path 514 when turned with the calculated bank angle Θ (task 1506).

Process 1500 may continue by turning early at the calculated bank angle from the current position 506 to reach a future point 804 ahead of the planned position 504 on the planned flight path 514 (task 1508).

Process 1500 may continue by intercepting the planned position 504 (task 1510).

Figure 16:
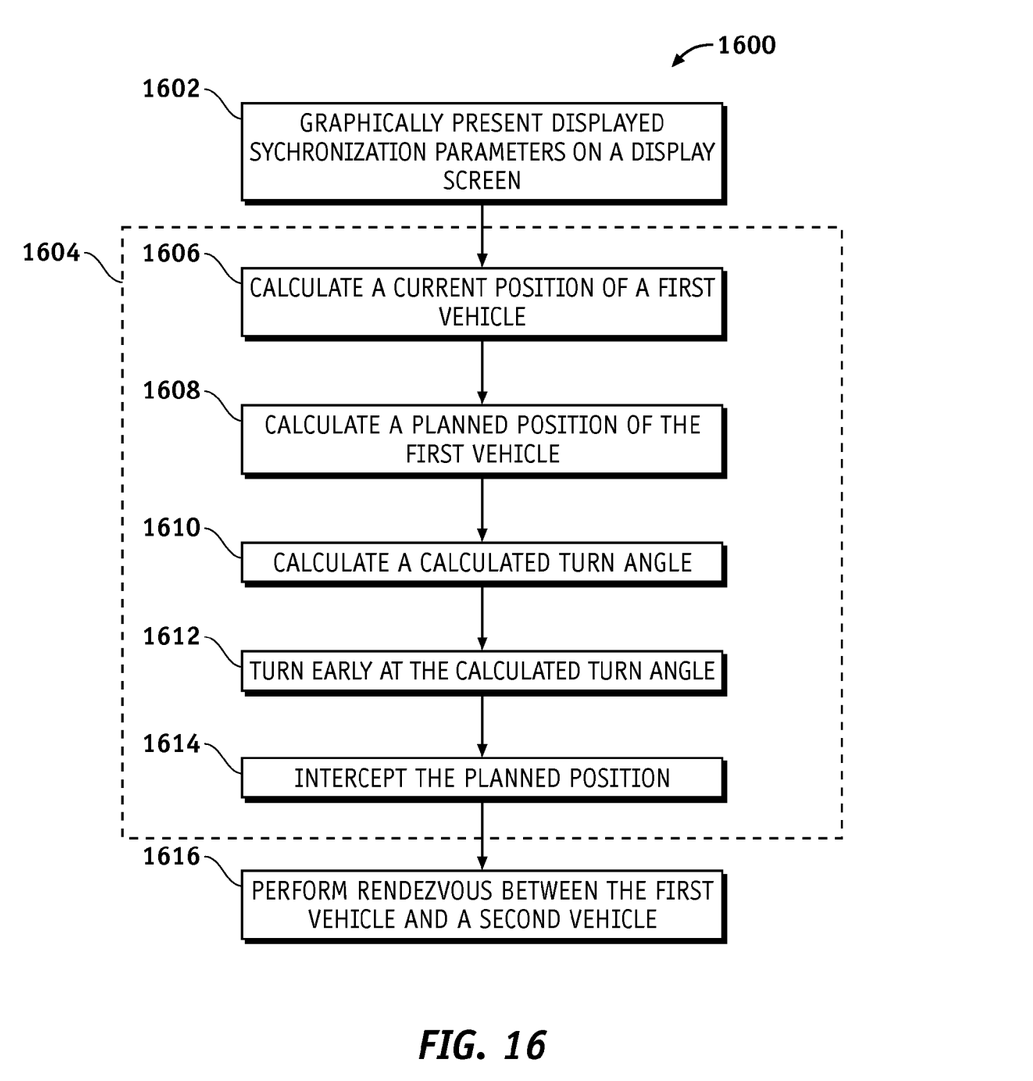
FIG. 16 is an illustration of an exemplary flowchart showing a process for coordinating positions of vehicles in motion according to an embodiment of the disclosure.

FIG. 16 is an illustration of an exemplary flowchart showing process 1600 for coordinating vehicles in motion according to an embodiment of the disclosure. The various tasks performed in connection with process 1600 may be performed, by software, hardware, firmware, a computer-readable medium having computer executable instructions for performing the process method, or any combination thereof. The process 1600 may be recorded in a computer-readable medium such as a semiconductor memory, a magnetic disk, an optical disk, and the like, and can be accessed and executed, for example, by a computer CPU such as the processor module 1412 in which the computer-readable medium is stored. It should be appreciated that process 1600 may include any number of additional or alternative tasks, the tasks shown in FIG. 16 need not be performed in the illustrated order, and process 1600 may be incorporated into a more comprehensive procedure or process having additional functionality not described in detail herein. For illustrative purposes, the following description of process 1600 may refer to elements mentioned above in connection with FIGS. 3-14. In practical embodiments, portions of the process 1600 may be performed by different elements of the system 1300 and system 1400 such as: the a tanker aircraft transceiver module 1302, the receiver aircraft transceiver module 1304, the tanker aircraft GPS module 1310, the receiver aircraft receiver GPS module 1312, the display module 1402, the rabbit calculation modulation 1406, the bank angle calculation module 1408, the rendezvous module 1410, the processor module 1412, the memory module 1414, and the communication module 1416.

Process 1600 may begin by graphically presenting displayed synchronization parameters on a display screen 1404 such that a user determines a planned position of a first vehicle on a planned path in order to arrive at a predetermined at a correct time (task 1602).

Process 1600 may than continue by synchronizing the first vehicle with the planned position on the planned path using the displayed synchronization parameters (task 1604). In this manner, a GPS module such as the tanker aircraft GPS module 1310 calculates a current position of the first vehicle (task 1606), the rabbit calculation module 1406 calculates the planned position of the first vehicle (task 1608), the bank angle calculation module 1408 calculates a turn angle such that the first vehicle intercepts the planned path when turned with the turn angle (task 1610). The displayed synchronization parameters may comprise, for example but without limitation, a calculated turn angle, a planned position on a planned path, a planned path, an orbit pattern, a current path, and the like.

Process 1600 may then continue by the first vehicle turning at the calculated turn angle from the current position to reach a future point ahead of the planned position on the planned path (task 1612).

Process 1600 may then continue by intercepting the planned position (task 1614).

Process 1600 may then continue by performing rendezvous between the first vehicle and a second vehicle (task 1616). In this manner, the system 1300 communicates the performance parameters between the first vehicle and the second vehicle, and the bank angle calculation module 1408 determines the turn angle for the first vehicle for turning ahead of the planned position to allow rendezvous with the second vehicle. The performance parameters comprise, for example but without limitation, a first vehicle velocity, a first vehicle coordinates, a second vehicle coordinates, a second vehicle velocity, a second vehicle waypoints, and a second vehicle waypoints desired velocities, timing information such as estimated time of arrival (ETA) (on time, minutes early, or minutes late), altitude, and the like.

In this way, embodiments of the disclosure provide systems and methods that provide a synchronization and rendezvous for aircraft. Embodiments automatically calculate a planned position and indicate same on a display screen to show where the aircraft needs to be at any given time.

When implemented in software or firmware, various elements of the systems 1300-1400 described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, an RF link, or the like.

Those skilled in the art will understand that the various illustrative blocks, modules, circuits, and processing logic described in connection with the embodiments such as system 1300-1400 disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention. While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 13-14 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An aircraft position synchronization system further comprising:
   a processor module;
   a memory module;
   a rabbit calculation module operable to calculate a planned position on an orbit pattern of a first aircraft in flight;
   a display module operable to graphically display:
      the orbit pattern;
      the planned position and the at least one planned velocity vector moving in real-time along the orbit pattern;
      the planned position-time projection vector;
      an actual position of the first aircraft; and
      at least one actual position-time projection vector of the first aircraft based on at least one bank angle of the first aircraft,
      such that a user determines the planned position of the first aircraft on the planned position-time projection vector in order to arrive at a predetermined position at a correct time;
   a rendezvous module operable to coordinate the first aircraft with at least one second aircraft in flight; and
   a bank angle calculation module operable to calculate a calculated bank angle based on performance parameters of the second aircraft such that the first aircraft intercepts the planned position-time projection vector at the planned position if the first aircraft is turned with the calculated bank angle.

2. The system of claim 1, further comprising a communication module operable to communicate the performance parameters between the first aircraft and the at least one second aircraft.

3. The system of claim 1, wherein the rendezvous module is further operable to compute a position-time projection vector for the first aircraft and the at least one second aircraft and guide the first aircraft and the at least one second aircraft to a rendezvous position.

4. The system of claim 1, wherein the rendezvous module is further operable to:
   receive a position of at least one second aircraft; and
   coordinate the planned position of the first aircraft with at least one receiver aircraft based on the position of the at least one second aircraft.

5. The system of claim 1, wherein the first aircraft is a UAV and the at least one second aircraft is a UAV.

6. The system of claim 1, further comprising a GPS module operable to calculate a current position of the first aircraft.

7. The system of claim 1, wherein the first aircraft is a tanker aircraft and the at least second aircraft is a receiver aircraft.

8. A method for synchronizing aircraft positions in flight, the method comprising:
   an aerial refueling synchronization and rendezvous system performing the steps of:
   calculating a planned position on an orbit pattern of a first aircraft in flight and a planned position-time projection vector comprising at least one planned velocity vector of the planned position; and
   displaying graphically on a display screen:
      the orbit pattern;
      the planned position and the planned velocity vector moving in real-time along the orbit pattern;
      the planned position-time projection vector;
      an actual position of the first aircraft; and
      at least one actual position-time projection vector of the first aircraft based on at least one bank angle of the first aircraft;
      such that a user determines the planned position of the first aircraft on the planned position-time projection vector in order to arrive at a predetermined position at a correct time;
   calculating a calculated bank angle such that the first aircraft intercepts the planned position-time projection vector if the first aircraft turns with a calculated bank angle;
   continuously and automatically receiving performance information of a second aircraft for a duration of a sync event and automatically adjusting the calculated bank angle based on the performance information until synched;
   turning the first aircraft early at the calculated bank angle from a current position to reach a future point ahead of the planned position on the planned position-time projection vector; and
   intercepting the planned position.

9. The method of claim 8, further comprising performing rendezvous with a second aircraft.

10. A method of coordinating positioning of vehicles in motion, the method comprising: an aerial refueling synchronization and rendezvous system performing the steps of:
    graphically presenting on a display screen displayed parameters comprising:
       an orbit pattern of a first vehicle;
       a planned position and at least one planned velocity vector of the planned position moving in real-time along the orbit pattern;
       a planned position-time projection vector comprising the at least one planned velocity vector;
       a current position of the first vehicle; and
       at least one actual position-time projection vector of the first vehicle based on at least one turn angle of the first vehicle,
       such that a user determines the planned position of a first vehicle on the planned position-time projection vector in order to arrive at a predetermined position at a correct time; and
    synchronizing the first vehicle with the planned position on the planned position-time projection vector using the displayed parameters;
    performing a rendezvous between the first vehicle and a second vehicle;
    calculating the current position of the first vehicle;
    calculating the planned position of the first vehicle;
    calculating a calculated turn angle such that the first vehicle intercepts the planned position-time projection vector when turned with the calculated turn angle;
    turning at the calculated turn angle from the current position to reach a future point ahead of the planned position on the planned position-time projection vector;
    continuously and automatically receiving performance information of a second aircraft for a duration of a sync event and automatically adjusting the calculated bank angle based on the performance information until synched; and
    intercepting the planned position.

11. The method of claim 10, wherein the step of performing the rendezvous comprises:
    communicating performance parameters between the first vehicle and a second vehicle; and
    determining a turn angle for the first vehicle for turning ahead of the planned position to allow rendezvous with the second vehicle.

12. The method of claim 11, wherein the performance parameters comprise at least one of the group consisting of: a first vehicle velocity, a first vehicle coordinates, a second vehicle indication of contact with the first vehicle, a second vehicle actual position, a second vehicle coordinates, a second vehicle velocity, a second vehicle waypoints, timing information, altitude, and a second vehicle waypoints desired velocities.

13. The method of claim 10, wherein the first vehicle is a tanker aircraft and the second vehicle is a receiver aircraft.

14. The system of claim 1, wherein the first aircraft performs a banked turn with a second bank angle if the planned position is missed by the at least one second aircraft.

15. An aircraft position synchronization system comprising:
a processor module;
a memory module;
a rabbit calculation module operable to calculate a planned position on an orbit pattern of a first aircraft in flight;
a display module operable to graphically display:
the orbit pattern;
the planned position and the at least one planned velocity vector moving in real-time along the orbit pattern;
a planned position-time projection vector of the first aircraft in time increments, an actual position-time projection vector of the first aircraft in time increments, and effects of winds on the planned velocity vector of the planned position-time projection vector of the first aircraft;
an actual position of the first aircraft; and
at least one actual position-time projection vector of the first aircraft based on at least one bank angle of the first aircraft,
such that a user determines the planned position of the first aircraft on the planned position-time projection vector in order to arrive at a predetermined position at a correct time; and
a rendezvous module operable to coordinate the first aircraft with at least one second aircraft in flight.

16. A method for synchronizing aircraft positions in flight, the method comprising: an aerial refueling synchronization and rendezvous system performing the steps of:
calculating a planned position on an orbit pattern of a first aircraft in flight and a planned position-time projection vector comprising at least one planned velocity vector of the planned position; and
displaying graphically on a display screen:
the orbit pattern;
the planned position and the planned velocity vector moving in real-time along the orbit pattern;
a planned position-time projection vector of the first aircraft in time increments, and effects of winds on the planned velocity vector of the planned position-time projection vector of the first aircraft;
an actual position of the first aircraft; and
at least one actual position-time projection vector of the first aircraft based on at least one bank angle of the first aircraft,
such that a user determines the planned position of the first aircraft on the planned position-time projection vector in order to arrive at a predetermined position at a correct time;
a current position; and
an actual position-time projection vector in time increments of the first aircraft.

17. A method of coordinating positioning of vehicles in motion, comprising: an aerial refueling synchronization and rendezvous system performing the steps of:
graphically presenting on a display screen displayed parameters comprising:
an orbit pattern of a first vehicle;
a planned position and at least one planned velocity vector of the planned position moving in real-time along the orbit pattern;
a planned position-time projection vector comprising the at least one planned velocity vector;
a current position of the first vehicle; and
at least one actual position-time projection vector of the first vehicle based on at least one turn angle of the first vehicle,
such that a user determines the planned position of a first vehicle on the planned position-time projection vector in order to arrive at a predetermined position at a correct time;
synchronizing the first vehicle with the planned position on the planned position-time projection vector using the displayed parameters;
performing a rendezvous between the first vehicle and a second vehicle;
calculating a current position of the first vehicle;
calculating the planned position of the first vehicle;
calculating a calculated turn angle such that the first vehicle intercepts the planned position-time projection vector when turned with the calculated turn angle;
turning at the calculated turn angle from the current position to reach a future point ahead of the planned position on the planned position-time projection vector;
continuously and automatically receiving performance information of a second aircraft for a duration of a sync event and automatically adjusting the calculated bank angle based on the performance information until synched;
intercepting the planned position; and
graphically presenting on the display screen: the planned position-time projection vector in time increments, and the at least one actual position-time projection vector in time increments.

* * * * *